US011799071B2

(12) United States Patent
Jeong et al.

(10) Patent No.: US 11,799,071 B2
(45) Date of Patent: Oct. 24, 2023

(54) POSITIVE ELECTRODE ACTIVE MATERIAL FOR LITHIUM SECONDARY BATTERY, METHOD OF PREPARING THE SAME, AND POSITIVE ELECTRODE FOR LITHIUM SECONDARY BATTERY AND LITHIUM SECONDARY BATTERY WHICH INCLUDE THE POSITIVE ELECTRODE ACTIVE MATERIAL

(71) Applicant: LG Chem, Ltd., Seoul (KR)

(72) Inventors: Myung Gi Jeong, Daejeon (KR); Se Hwan Son, Daejeon (KR); Seung Beom Cho, Daejeon (KR); Sang Soon Choi, Daejeon (KR)

(73) Assignee: LG Chem, Ltd.

( * ) Notice: Subject to any disclaimer, the term of this patent is extended or adjusted under 35 U.S.C. 154(b) by 403 days.

(21) Appl. No.: 17/050,553

(22) PCT Filed: May 10, 2019

(86) PCT No.: PCT/KR2019/005631
§ 371 (c)(1),
(2) Date: Oct. 26, 2020

(87) PCT Pub. No.: WO2019/216694
PCT Pub. Date: Nov. 14, 2019

(65) Prior Publication Data
US 2021/0234155 A1    Jul. 29, 2021

(30) Foreign Application Priority Data

May 11, 2018  (KR) ......................... 10-2018-0054292

(51) Int. Cl.
*H01M 4/525*   (2010.01)
*H01M 4/36*    (2006.01)
(Continued)

(52) U.S. Cl.
CPC .......... *H01M 4/364* (2013.01); *C01G 53/006* (2013.01); *C01G 53/50* (2013.01); *H01M 4/131* (2013.01);
(Continued)

(58) Field of Classification Search
CPC .......... H01M 4/36–525; H01M 4/364; H01M 4/0471; H01M 4/131; H01M 4/134;
(Continued)

(56) References Cited

U.S. PATENT DOCUMENTS 9,337,487 B2     5/2016 Sun et al.
2014/0158932 A1  6/2014 Sun et al.
(Continued)

FOREIGN PATENT DOCUMENTS

CN    104521039 A    4/2015
CN    107251282 A    10/2017
(Continued)

OTHER PUBLICATIONS

P. Hou, Core-shell and concentration-gradient cathodes prepared via co-precipitation reaction for advanced lithium-ion batteries, RSC, J. Mater. Chem. A., 4254-4279 (Year: 2017).*
(Continued)

*Primary Examiner* — Milton I Cano
*Assistant Examiner* — Oscar Londono
(74) *Attorney, Agent, or Firm* — Lerner David LLP (57) ABSTRACT

A positive electrode active material includes a lithium transition metal oxide, in which a cobalt content in the lithium transition metal oxide is less than a manganese content, wherein at least one of nickel, cobalt, and manganese in the lithium transition metal oxide has a concentration gradient that gradually changes from a center of a particle to a surface thereof, the positive electrode active material is in the form of a secondary particle formed by agglomeration of
(Continued)

primary particles, and a ratio in which angles between c-axis directions, which are measured at at least 8 points on a surface of the positive electrode active material by TEM analysis, and a growth direction of the particle at the measuring point satisfy 85° to 95° is 60% or more.

8 Claims, 5 Drawing Sheets

(51) Int. Cl.
*H01M 4/131* (2010.01)
*H01M 4/134* (2010.01)
*H01M 4/505* (2010.01)
*H01M 10/0525* (2010.01)
*C01G 53/00* (2006.01)
*H01M 4/04* (2006.01)
*H01M 4/02* (2006.01)

(52) U.S. Cl.
CPC ........... *H01M 4/134* (2013.01); *H01M 4/505* (2013.01); *H01M 4/525* (2013.01); *H01M 10/0525* (2013.01); *C01P 2002/52* (2013.01); *C01P 2004/04* (2013.01); *C01P 2006/40* (2013.01); *H01M 4/0471* (2013.01); *H01M 2004/028* (2013.01)

(58) Field of Classification Search
CPC ............. H01M 4/505; H01M 10/0525; H01M 2004/028; C01G 53/42; C01G 53/50; C01G 53/006; C01P 2002/52; C01P 2004/04; C01P 2006/40
See application file for complete search history.

(56) References Cited

U.S. PATENT DOCUMENTS

| | | |
|---|---|---|
| 2015/0111106 A1 | 4/2015 | Son et al. |
| 2015/0280211 A1 | 10/2015 | Kikuya et al. |
| 2015/0340686 A1 | 11/2015 | Sun et al. |
| 2016/0218350 A1* | 7/2016 | Noh ..................... H01M 4/525 |
| 2017/0170474 A1 | 6/2017 | Han et al. |
| 2018/0013129 A1 | 1/2018 | Lee et al. |
| 2018/0048015 A1 | 2/2018 | Lee et al. |
| 2018/0108940 A1 | 4/2018 | Kwon et al. |
| 2018/0294477 A1 | 10/2018 | Shin et al. |
| 2019/0372115 A1 | 12/2019 | Shin et al. |

FOREIGN PATENT DOCUMENTS

| | | |
|---|---|---|
| CN | 107636866 A | 1/2018 |
| KR | 20140085347 A | 7/2014 |
| KR | 20150045337 A | 4/2015 |
| KR | 20160032787 A | 3/2016 |
| KR | 20160129764 A | 11/2016 |
| KR | 20160149162 A | 12/2016 |
| KR | 101849719 | 2/2017 |
| KR | 20170038485 A | 4/2017 |
| KR | 20170068224 A | 6/2017 |
| WO | 2014061654 A1 | 4/2014 |
| WO | 2017095133 A1 | 6/2017 |

OTHER PUBLICATIONS

International Search Report for Application No. PCT/KR2019/005631 dated Aug. 19, 2019, 2 pages.

Liang, et al., "Synthesis and characterization of full concentration-gradient LiNi0.7 Co0.1Mn0.2O2 cathode material for lithium-ion batteries," Journal of Alloys and Compounds, Feb. 11, 2015, pp. 92-100, vol. 635.

* cited by examiner

POSITIVE ELECTRODE ACTIVE MATERIAL FOR LITHIUM SECONDARY BATTERY, METHOD OF PREPARING THE SAME, AND POSITIVE ELECTRODE FOR LITHIUM SECONDARY BATTERY AND LITHIUM SECONDARY BATTERY WHICH INCLUDE THE POSITIVE ELECTRODE ACTIVE MATERIAL

CROSS-REFERENCE TO RELATED APPLICATIONS

This application is a national phase entry under 35 U.S.C. § 371 of International Application No. PCT/KR2019/005631, filed May 10, 2019, which claims the benefit of Korean Patent Application No. 10-2018-0054292, filed on May 11, 2018, the disclosure of which are incorporated herein in their entirety by reference.

TECHNICAL FIELD

The present invention relates to a positive electrode active material for a lithium secondary battery, a method of preparing the positive electrode active material, and a positive electrode for a lithium secondary battery and a lithium secondary battery which include the positive electrode active material.

BACKGROUND ART

Demand for secondary batteries as an energy source has been significantly increased as technology development and demand with respect to mobile devices have increased. Among these secondary batteries, lithium secondary batteries having high energy density, long cycle life, and low self-discharging rate have been commercialized and widely used.

Lithium transition metal composite oxides have been mainly used as a positive electrode active material of the lithium secondary battery, and, among these oxides, a lithium cobalt oxide ($LiCoO_2$) having a high operating voltage and excellent capacity characteristics has been mainly used. However, since the lithium cobalt oxide has poor thermal properties due to an unstable crystal structure caused by delithiation and is expensive, there is a limitation in using a large amount of the lithium cobalt oxide as a power source of a medium and large sized device such as an electric vehicle.

Recently, various lithium transition metal oxides, such as $LiNiO_2$, $LiMnO_2$, $LiMn_2O_4$, and $LiFePO_4$, have been developed as materials for replacing the lithium cobalt oxide and being used in the medium and large sized device such as an electric vehicle. However, the $LiNiO_2$ is disadvantageous in that the synthesis thereof is difficult by a simple solid phase reaction, and thermal stability and cycle characteristics are poorer than those of $LiCoO_2$. $LiMnO_2$ and $LiMn_2O_4$ also have a limitation in that capacities are lower and high-temperature characteristics are poorer than those of $LiCoO_2$. Particularly, with respect to $LiMn_2O_4$, some have been commercialized as low-cost products, but life characteristics were poor due to structural distortion (Jahn-Teller distortion) caused by $Mn^{3+}$. A significant amount of research has currently been conducted for the application of $LiFePO_4$ for a hybrid electric vehicle (HEV), but the application to other areas may be difficult due to low ionic conductivity.

For this reason, a material, which is currently very much in the spotlight as a positive electrode active material for replacing the lithium cobalt oxide, is a lithium nickel cobalt manganese oxide [$Li(Ni_oCo_pMn_q)O_2$, where o, p, and q each independently are an atomic fraction of oxide composition elements, wherein $0<o\leq1$, $0<p\leq1$, $0<q\leq1$, and $o+p+q=1$].

Recently, with increasing interest in electric vehicles, the rising price of a cobalt raw material has become an important issue. It is expected that the price of the cobalt raw material will be continuously increased, and, accordingly, there is a need to develop a positive electrode active material having a reduced cobalt content.

However, the lithium nickel cobalt manganese oxide has a limitation in that discharge capacity and output characteristics are reduced as the cobalt content is reduced when a nickel content is the same. Thus, there is a need to develop a positive electrode material in which capacity reduction is small while maintaining typical output characteristics and the cobalt content is reduced.

DISCLOSURE OF THE INVENTION

Technical Problem

An aspect of the present invention provides a positive electrode active material having excellent output characteristics while having a relatively small cobalt content.

Another aspect of the present invention provides a cobalt-reduced positive electrode active material with excellent structural stability and improved lithium mobility.

Another aspect of the present invention provides a method of preparing the positive electrode active material.

Another aspect of the present invention provides a positive electrode for a lithium secondary battery which includes the positive electrode active material.

Another aspect of the present invention provides a lithium secondary battery including the positive electrode for a lithium secondary battery.

Technical Solution

According to an aspect of the present invention, there is provided a positive electrode active material including a lithium transition metal oxide having an average composition represented by Formula 1 in which a cobalt content in the lithium transition metal oxide is less than a manganese content, wherein at least one of nickel, cobalt, and manganese in the lithium transition metal oxide has a concentration gradient that gradually changes from a center of a particle to a surface thereof, the positive electrode active material is in the form of a secondary particle formed by agglomeration of primary particles, and a ratio in which angles between c-axis directions, which are measured at at least 8 points on a surface of the positive electrode active material by TEM analysis, and a growth direction of the particle at the measuring point satisfy 85° to 95° is 60% or more:

$$Li_{1+a}Ni_xCo_yMn_zM^1_wO_2 \qquad [\text{Formula 1}]$$

in Formula 1, $0\leq a\leq0.3$, $0.65\leq x<1$, $0<y\leq0.35$, $0<z\leq0.35$, $0\leq w\leq0.02$, and $y<z$, and $M^1$ includes at least one selected from the group consisting of aluminum (Al), zirconium (Zr), magnesium (Mg), zinc (Zn), yttrium (Y), iron (Fe), and titanium (Ti).

According to another aspect of the present invention, there is provided a method of preparing a positive electrode active material which includes: preparing a first transition metal-containing solution including a nickel raw material and a second transition metal-containing solution having a transition metal concentration different from that of the first transition metal-containing solution and including a nickel raw material, a cobalt raw material, and a manganese raw material; preparing a positive electrode active material precursor by mixing the first transition metal-containing solution and the second transition metal-containing solution while gradually changing a mixing ratio of the first transition metal-containing solution to the second transition metal-containing solution; and mixing the positive electrode active material precursor with a lithium-containing raw material and sintering the mixture to synthesize a positive electrode active material, wherein the preparing of the positive electrode active material precursor is controlled such that a pH is gradually decreased as a nickel content in the mixed solution is reduced.

According to another aspect of the present invention, there is provided a positive electrode for a lithium secondary battery which includes the positive electrode active material according to the present invention.

According to another aspect of the present invention, there is provided a lithium secondary battery including the positive electrode according to the present invention.

Advantageous Effects

In a case in which a transition metal has a concentration gradient in an active material particle and a ratio in which a particle growth direction and a c-axis direction of a crystal at a surface satisfy a certain angle is high as in a positive electrode active material of the present invention, since degradation of output characteristics due to a reduction in cobalt content may be minimized, excellent output characteristics may be obtained even if a small amount of cobalt is used.

According to the present invention, production costs of a secondary battery including a lithium transition metal oxide may be reduced by maintaining a cobalt content in the lithium transition metal oxide less than a manganese content.

Also, since at least one of transition metals included in the lithium transition metal oxide has a concentration gradient that gradually changes from a center of a particle to a surface thereof, structural stability is improved while having high capacity characteristics, and thus, life characteristics of a battery may be improved when the lithium transition metal oxide is used in the battery.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

Positive Electrode Active Material

A lithium cobalt-based oxide having a high operating voltage and excellent capacity characteristics has been used as a positive electrode active material of a conventional lithium secondary battery, but, since the lithium cobalt-based oxide has poor thermal properties due to an unstable crystal structure caused by delithiation and is expensive, there is a limitation in using a large amount of the lithium cobalt-based oxide as a power source of a medium and large sized device. A lithium nickel cobalt manganese-based oxide has been used to replace the lithium cobalt-based oxide, but the lithium nickel cobalt manganese-based oxide has a limitation in that discharge capacity and output characteristics are reduced as a cobalt content is reduced to reduce manufacturing costs.

Thus, the present inventors have found that, since mobility of lithium ions in a lithium transition metal oxide is improved by controlling such that at least one of metallic elements included in the lithium nickel cobalt manganese-based oxide has a concentration gradient that gradually changes from a center of a particle to a surface thereof and a c-axis direction, which is measured by transmission electron microscope (TEM) analysis on a surface of the particle, and a growth direction of the particle at a measuring point form a specific angle, discharge capacity and output characteristics are improved when the lithium nickel cobalt manganese-based oxide is used in a battery even if the cobalt content is reduced, thereby leading to the completion of the present invention.

Hereinafter, a positive electrode active material according to the present invention will be described in detail.

The positive electrode active material according to the present invention is a positive electrode active material which includes a lithium transition metal oxide in which a cobalt content in the lithium transition metal oxide is less than a manganese content, wherein at least one of nickel, cobalt, and manganese in the lithium transition metal oxide has a concentration gradient that gradually changes from a center of a particle to a surface thereof, the positive electrode active material is in the form of a secondary particle formed by agglomeration of primary particles, and a ratio in which angles between c-axis directions, which are measured at at least 8 points on a surface of the positive electrode active material by TEM analysis, and a growth direction of the particle at the measuring point satisfy 85° to 95° is 60% or more.

Specifically, the positive electrode active material according to the present invention includes a lithium transition metal oxide having an average composition represented by Formula 1 below.

$$Li_{1+a}Ni_xCo_yMn_zM^1_wO_2 \quad \text{[Formula 1]}$$

In Formula 1, $0 \leq a \leq 0.3$, $0.65 \leq x < 1$, $0 < y \leq 0.35$, $0 < z \leq 0.35$, $0 \leq w \leq 0.02$, and $y < z$, and $M^1$ includes at least one selected from the group consisting of aluminum (Al), zirconium (Zr), magnesium (Mg), zinc (Zn), yttrium (Y), iron (Fe), and titanium (Ti).

Specifically, the lithium transition metal oxide may include nickel in an amount of 60 mol % or more to less than 100 mol % based on the total number of moles of transition metal elements excluding lithium. In a case in which the amount of the nickel in the lithium transition metal oxide is outside the above range, since capacity of the positive electrode active material is decreased, the positive electrode active material may not be applied to an electrochemical device requiring high capacity. The greater the amount of the nickel within the above range is, the higher the capacity characteristics of a battery including the lithium transition metal oxide are exhibited. However, the greater the amount of the nickel is, an amount of cobalt and/or manganese is relatively reduced, and, accordingly, charge and discharge efficiency may be reduced. Thus, the lithium transition metal oxide may preferably include the nickel in an amount of 65 mol % to 75 mol % based on the total number of moles of the transition metal elements excluding lithium.

Also, the lithium transition metal oxide may include manganese in an amount of greater than 0 mol % to 35 mol % or less, preferably 15 mol % to 35 mol %, and most preferably 20 mol % or more to less than 35 mol % based on the total number of moles of the transition metal elements excluding lithium. In a case in which the amount of the manganese is outside the above range, high capacity may not be achieved.

Furthermore, the lithium transition metal oxide may include cobalt in an amount of greater than 0 mol % to 35 mol % or less, preferably greater than 0 mol % to 20 mol % or less, and most preferably greater than 0 mol % to 15 mol % or less based on the total number of moles of the transition metal elements excluding lithium. In a case in which the amount of the cobalt is outside the above range and is greater than 35 mol %, overall cost of raw materials may be increased due to the large amount of the cobalt and reversible capacity may be somewhat decreased, and, in a case in which the amount of the cobalt is 0 mol %, sufficient rate capability and output characteristics may not be exhibited.

According to the present invention, in the lithium transition metal oxide, the amount of the manganese may be greater than the amount of the cobalt. For example, in a case in which the amount of the manganese is less than or equal to the amount of the cobalt, there may be limitations such as increases in manufacturing costs due to the increase in price of a cobalt raw material, a decrease in lifetime, an increase in resistance increase rate, and an increase in gas generation amount.

Specifically, in the lithium transition metal oxide, a molar ratio of cobalt:manganese may be in a range of greater than 1:1 to 1:10 or less, preferably greater than 1:1 to 1:5 or less, and more preferably greater than 1:1 to 1:3 or less. For example, in a case in which the molar ratio of cobalt:manganese in the lithium transition metal oxide is in a range of greater than 1:1 to 1:10 or less, since the relatively small amount of the cobalt is included, an increase in cost may not only be suppressed, but life characteristics, resistance characteristics, and gas generation amount may also be improved.

The positive electrode active material may be selectively doped with doping element $M^1$, if necessary.

The doping element $M^1$ may be used without particular limitation as long as it may contribute to an improvement in structural stability of the positive electrode active material, wherein, for example, the doping element $M^1$ may include at least one selected from the group consisting of Al, Zr, Mg, Zn, Y, Fe, and Ti.

The doping element $M^1$ may be included in an amount of 2 mol % or less, for example, 1 mol % to 2 mol % based on the total number of moles of the transition metal elements excluding lithium. For example, in a case in which the doping element $M^1$ is included within the above amount range, the doping element $M^1$ may be uniformly included on the surface and inside of the positive electrode active material, and, as a result, the structural stability of the positive electrode active material may be improved to improve the output characteristics.

Also, the positive electrode active material is in the form of a secondary particle formed by agglomeration of primary particles. Specifically, the positive electrode active material may include columnar-structured primary particles, which are grown in a surface direction from a center of the positive electrode active material, in a surface portion.

Since the positive electrode active material includes the columnar-structured primary particles, which are grown in the surface direction from the center of the positive electrode active material, in the surface portion, mobility of lithium ions on the surface of the positive electrode active material is improved, and thus, initial capacity characteristics and output characteristics may be improved when the positive electrode active material is used in the battery.

The columnar-structure may have an aspect ratio of 2 to 5, for example, 3 to 5. In a case in which the aspect ratio of the columnar structure satisfies the above range, capacity, lifetime, and resistance increase rate may be improved.

Furthermore, the positive electrode active material according to the present invention includes a lithium transition metal oxide having a layered structure. For example, a ratio in which angles between c-axis directions, which are measured at at least 8 points on the surface of the positive electrode active material by TEM analysis, and a growth direction of the particle at the measuring point satisfy 85° to 95° may be 60% or more.

With respect to the lithium transition metal oxide having a layered crystal structure, lithium ions move along a plane direction satisfying 85° to 95° to the c-axis direction.

Thus, in a case in which the ratio in which the angle between the c-axis direction and the growth direction of the lithium transition metal oxide particle satisfies 85° to 95° is less than 60%, because the growth direction of the lithium transition metal oxide particle and the plane direction (lithium path direction) satisfying 85° to 95° to the c-axis direction are misaligned on the surface of the positive electrode active material, since the movement of lithium ions deintercalated from the inside of the positive electrode active material may be blocked on the surface, lithium mobility may be reduced. However, with respect to the positive electrode active material of the present invention, since the ratio in which the angle between the measured c-axis direction and the growth direction of the particle satisfies 85° to 95° is high at 60% or more, the lithium ions deintercalated from the inside of the positive electrode active material may easily move to the outside of the positive electrode active material, and thus, the lithium mobility is excellent.

In this case, the crystal structure of the positive electrode active material may be observed by cutting the positive electrode active material and using a transmission electron microscope (TEM), and the c-axis direction of the positive electrode active material may be observed by fast Fourier transform (FFT) or a selected area diffraction pattern (SADP).

Also, at least one of nickel, cobalt, and manganese included in the positive electrode active material may be increased or decreased while having a concentration gradient that gradually changes from the center of the positive electrode active material particle to the surface of the particle. In this case, a concentration gradient slope of the transition metal may be constant. The nickel, cobalt, and manganese included in the positive electrode active material each independently may have a single concentration gradient slope value.

Specifically, the nickel included in the positive electrode active material may have a concentration gradient that gradually decreases from the center of the positive electrode active material particle to the surface of the particle. In this case, a concentration gradient slope of the nickel may be constant from the center of the positive electrode active material particle to the surface thereof. As described above, in a case in which the nickel has a gradient in which a high concentration of the nickel (Ni) is maintained at the center of the positive electrode active material particle and the concentration is gradually decreased toward the surface of the particle, since the center of the particle includes a high content of the nickel, high capacity characteristics of the positive electrode active material may be maintained, and, since the surface of the particle includes a low content of the nickel to reduce surface reactivity due to catalytic action of the Ni, the structural stability of the positive electrode active material may be improved.

Furthermore, at least one of the manganese and cobalt included in the positive electrode active material may have a concentration gradient that gradually increases from the center of the positive electrode active material particle to the surface thereof. In this case, since the concentration of the manganese and/or cobalt at the center of the positive electrode active material particle remains low and the concentration of the manganese and/or the cobalt is relatively increased toward the surface of the positive electrode active material particle, excellent rate capability and life characteristics may be achieved.

For example, with respect to a conventional positive electrode active material in which the content of cobalt is less than the content of manganese, discharge capacity may be reduced. However, since the positive electrode active material, in which the content of cobalt is less than the content of manganese, has a concentration gradient as in the present invention, the reduction in the discharge capacity may be suppressed, and, accordingly, decreases in low-temperature characteristics and high-temperature life characteristics may also be prevented.

Since the transition metal has a concentration gradient in which the concentration of the transition metal continuously changes depending on a position in the positive electrode active material as in the present invention, an abrupt phase boundary region is not present from the center of the positive electrode active material particle to the surface thereof, and thus, its crystal structure is stabilized, thermal stability is increased, and high capacity, long lifetime, and good thermal stability may be obtained when the positive electrode active material is used in the secondary battery. Also, capacity and output characteristics may be maintained even if the content of the cobalt is decreased. In a case in which the concentration gradient slope of the transition metal is constant, the effect of improvement in the structural stability may be further improved. Furthermore, since the concentration of each transition metal in the positive electrode active material particle is changed by the concentration gradient, the effect of the positive electrode active material on the improvement of battery performance may be further improved by easily using properties of the corresponding transition metal.

In the present invention, the expression "the concentration of the transition metal has a gradually changing (increasing or decreasing) gradient" denotes that the transition metal has a concentration distribution in which the concentration of the transition metal is gradually changed across the entire particle.

Also, in the present invention, the concentration gradient structure and concentration of the metal in the lithium composite metal oxide particle may be identified by using a method such as electron probe microanalysis (SPMA), inductively coupled plasma-atomic emission spectroscopy (ICP-AES), or time of flight secondary ion mass spectrometry (ToF-SIMS), wherein, specifically, etching is performed on the lithium composite metal oxide particle with argon gas for 1,000 seconds, and the concentration gradient structure and concentration of the metal may be measured by analyzing an amount of the element detected according to etching time from the start of the etching using X-ray photoelectron spectroscopy (XPS).

As described above, with respect to the positive electrode active material according to the present invention, since 60% or more of crystals of the positive electrode active material have a c-axis direction that forms a specific angle with the surface of the particle and the positive electrode active material has a concentration gradient even if the amount of the cobalt is reduced, a positive electrode active material having excellent electrochemical properties may be provided at a low cost without decreases in capacity characteristics and output characteristics.

Method of Preparing Positive Electrode Active Material

Next, a method of preparing the positive electrode active material according to the present invention will be described.

Specifically, in order to prepare the positive electrode active material according to the present invention, the method includes: preparing a first transition metal-containing solution including a nickel raw material and a second transition metal-containing solution having a transition metal concentration different from that of the first transition metal-containing solution and including a nickel raw material, a cobalt raw material, and a manganese raw material; preparing a positive electrode active material precursor by mixing the first transition metal-containing solution and the second transition metal-containing solution while gradually changing a mixing ratio of the first transition metal-containing solution to the second transition metal-containing solution; and mixing the positive electrode active material precursor with a lithium-containing raw material and sintering the mixture to synthesize a positive electrode active material. In this case, the preparing of the positive electrode active material precursor is controlled such that a pH is gradually decreased as a nickel content in the mixed solution is reduced.

Specifically, in order to prepare the positive electrode active material according to the present invention, a first transition metal-containing solution including a nickel raw material and a second transition metal-containing solution having a transition metal concentration different from that of the first transition metal-containing solution and including a nickel raw material, a cobalt raw material, and a manganese raw material are first prepared.

The first transition metal-containing solution may further selectively include at least one of a cobalt raw material and a manganese raw material, if necessary.

For example, the first transition metal-containing solution may be prepared by adding the nickel raw material to a solvent, particularly water or a mixture of water and an organic solvent (alcohol etc.) which may be uniformly mixed with the water, or after an aqueous solution including the nickel raw material is prepared, the aqueous solution may be mixed and used. In this case, each of the metal raw materials are mixed such that a ratio of nickel:cobalt:manganese in the first transition metal-containing solution is in a range of (80 to 100):(0 to 10):(0 to 20), for example, (90 to 100):(0 to 5):(0 to 10).

The second transition metal-containing solution includes a nickel raw material, a cobalt raw material, and a manganese raw material, and may be prepared in the same manner as the first transition metal-containing solution. In this case, each of the metal raw materials are mixed such that a ratio of nickel:cobalt:manganese in the second transition metal-containing solution is in a range of (50 to 80):(10 to 30):(10 to 35), for example, (50 to 60):(20 to 30):(15 to 35).

In this case, in both of the first transition metal-containing solution and the second transition metal-containing solution, an amount of the manganese raw material may be greater than an amount of the cobalt raw material. Accordingly, with respect to the prepared positive electrode active material precursor particle, an amount of manganese is greater than an amount of cobalt across the entire particle, and manufacturing costs may be reduced as the positive electrode active material precursor particle contains less cobalt raw material.

An each metallic element-containing sulfate, nitrate, acetic acid salt, halide, hydroxide, or oxyhydroxide may be used as the nickel, cobalt, and manganese raw materials, and the nickel, cobalt, and manganese raw materials may be used without particular limitation as long as these materials may be dissolved in the above-described solvent such as water.

Specifically, the nickel raw material may include $Ni(OH)_2$, NiO, NiOOH, $NiCO_3 \cdot 2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, a fatty acid nickel salt, or a nickel halide, and a mixture of at least one thereof may be used.

Also, the cobalt raw material may include $Co(OH)_2$, CoOOH, $CoSO_4$, $Co(OCOCH_3)_2 \cdot 4H_2O$, $Co(NO_3)_2 \cdot 6H_2O$, or $Co(SO_4)_2 \cdot 7H_2O$, and a mixture of at least one thereof may be used.

Furthermore, the manganese raw material may include a manganese oxide such as $Mn_2O_3$, $MnO_2$, and $Mn_3O_4$; a manganese salt such as $MnCO_3$, $Mn(NO_3)_2$, $MnSO_4$, manganese acetate, manganese dicarboxylate, manganese citrate, and a fatty acid manganese salt; an oxyhydroxide, and manganese chloride, and a mixture of at least one thereof may be used.

Subsequently, a positive electrode active material precursor is prepared by mixing the first transition metal-containing solution and the second transition metal-containing solution while gradually changing a mixing ratio of the first transition metal-containing solution to the second transition metal-containing solution.

In the preparing of the positive electrode active material precursor, it may be controlled such that a pH is gradually decreased as the nickel content in the mixed solution is reduced.

For example, the pH may be gradually decreased within a range of 13 to 9, preferably 12.5 to 9, and most preferably 12 to 10 as the nickel content in the mixed solution is reduced. In a case in which the pH is controlled to be gradually decreased as the nickel content is reduced during the preparation of the positive electrode active material precursor as described above, a c-axis direction on the surface of the positive electrode active material particle finally prepared may be effectively controlled.

Specifically, the positive electrode active material prepared while controlling the pH as described above may be formed such that a ratio in which angles between c-axis directions, which are measured at at least 8 points on the surface of the positive electrode active material by TEM analysis, and a growth direction at the measuring point satisfy 85° to 95° is 60% or more.

More specifically, during the preparation of the positive electrode active material precursor, a reaction is performed at a pH of 11 to 13, preferably 11 to 12 or 11.5 to 12, and most preferably 11.7 to 12 at the beginning of the reaction to form positive electrode active material precursor particle nucleus, and, later in the reaction, the positive electrode active material precursor particle are grown by performing a reaction at a pH of 9 to 11, preferably 10 to 11 or 10.5 to 11, and most preferably 10.8 to 11 by adjusting amounts of an ammonium ionic complexing agent and a basic aqueous solution added. Accordingly, the positive electrode active material precursor is not only in the form of a secondary particle in which primary particles are agglomerated, but may also include columnar-structured primary particles, which are grown in a surface direction from the center of the positive electrode active material, in a surface portion.

For example, during the preparation of the positive electrode active material precursor, in a case in which the pH is not changed and is the same across the entire particle, nucleus of the lithium transition metal oxide may be continuously formed during a co-precipitation reaction, and, accordingly, the growth of the primary particles may be decreased to reduce a ratio of the primary particles having a columnar structure. Accordingly, the positive electrode active material precursor particle prepared without changing the pH may have a form of a secondary particle in which primary particles are agglomerated without an orientation. Also, in a case in which the nucleus of the particles are grown at a low pH and the particles are then grown at a relatively high pH, a particle size distribution may be increased to cause non-uniformity of the primary particles.

During the preparation of the positive electrode active material precursor, since the reaction is performed in a state in which the first transition metal-containing solution is only present at the beginning of the reaction, precursor particles initially prepared have a composition of the first transition metal-containing solution and, thereafter, since the first transition metal-containing solution and the second transition metal-containing solution are mixed while a ratio of the first transition metal-containing solution to the second transition metal-containing solution is gradually changed, the composition of the precursor particle is also gradually changed to a composition of the second transition metal-containing solution from the center of the precursor particle to the surface thereof.

For example, in a case in which the reaction is performed such that the amount of nickel is high and the amount of manganese and/or cobalt is low in the first transition metal-containing solution and, in the second transition metal-containing solution, the amount of the nickel is lower and the amount of the manganese and/or cobalt is higher than that of the first transition metal-containing solution, precursor particles may be prepared in which a concentration of the nickel is decreased while the nickel has a continuous concentration gradient from the center of the active material particle in a surface direction of the particle, and concentrations of the manganese and cobalt are each independently increased while the manganese and cobalt have a continuous concentration gradient from the center of the particle in the surface direction of the particle.

Thus, the concentration gradient of the precursor particle may be controlled such that the prepared precursor particle has a desired composition at a desired position by adjusting the compositions of the first transition metal-containing solution and the second transition metal-containing solution, mixing speed, and mixing ratio, and a concentration gradient slope in this case may also be controlled.

Also, precipitates, in which the metal has a continuous concentration gradient from the center of the particle to the surface thereof, may be obtained in a single co-precipitation reaction process by continuously mixing the first transition metal-containing solution and the second transition metal-containing solution, and a concentration gradient of the metal and its slope in the active material precursor formed in this case may be easily adjusted by the compositions and mixed feed ratio of the first transition metal-containing solution and the second transition metal-containing solution.

Furthermore, the concentration gradient of the transition metal element in the particle may be formed by controlling reaction rate or reaction time. In order to produce a high density state in which the concentration of the specific metal is high, it is desirable to increase the reaction time and decrease the reaction rate, and, in order to produce a low density state in which the concentration of the specific metal is low, it is desirable to decrease the reaction time and increase the reaction rate.

Subsequently, the positive electrode active material precursor is mixed with a lithium-containing raw material and the mixture is sintered to synthesize a positive electrode active material.

The lithium-containing raw material is not particularly limited as long as it is a compound including a lithium source, but, preferably, at least one selected from the group consisting of lithium carbonate ($Li_2CO_3$), lithium hydroxide (LiOH), $LiNO_3$, $CH_3COOLi$, and $Li_2(COO)_2$ may be used.

An amount of the lithium-containing raw material used may be determined according to amounts of the lithium and the transition metal in the finally prepared positive electrode active material, and, specifically, the lithium-containing raw material may be used in an amount such that a molar ratio (molar ratio of lithium/metallic element) of lithium included in the lithium-containing raw material to the transition metal element included in the precursor for a positive electrode active material is in a range of 1.0 to 1.3, for example, 1.0 to 1.2.

During the mixing of the positive electrode active material precursor with the lithium-containing raw material, a doping element $M^1$ raw material (where $M^1$ includes at least one selected from the group consisting of Al, Zr, Mg, Zn, Y, Fe, and Ti) may be further selectively included, if necessary.

In a case in which the doping element $M^1$ raw material is further included as described above, the doping element $M^1$ raw material may be included in an amount of 2 mol % or less, for example, 1 mol % to 2 mol % based on the total number of moles of the positive electrode active material precursor.

Subsequently, a positive electrode active material is prepared by sintering the mixture at 780° C. to 900° C., preferably 800° C. to 880° C., and more preferably 810° C. to 870° C. for 20 hours to 25 hours. Since the sintering is performed within the above temperature range, crystallinity is improved, and thus, a positive electrode active material having improved structural stability may be prepared.

Positive Electrode for Secondary Battery

Next, provided is a positive electrode for a lithium secondary battery which includes the positive electrode active material according to the present invention.

Specifically, provided is the positive electrode for a lithium secondary battery which includes a positive electrode collector, and a positive electrode active material layer formed on the positive electrode collector, wherein the positive electrode active material layer includes the positive electrode active material according to the present invention.

In this case, since the positive electrode active material is the same as described above, detailed descriptions thereof will be omitted, and the remaining configurations will be only described in detail below.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

The positive electrode active material layer may include a conductive agent as well as selectively a binder, if necessary, in addition to the above positive electrode active material.

In this case, the positive electrode active material may be included in an amount of 80 wt % to 99 wt %, for example, 85 wt % to 98.5 wt % based on a total weight of the positive electrode active material layer. When the positive electrode active material is included in an amount within the above range, excellent capacity characteristics may be obtained.

The conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 0.1 wt % to 15 wt % based on the total weight of the positive electrode active material layer.

The binder improves the adhesion between the positive electrode active material particles and the adhesion between the positive electrode active material and the current collector. Specific examples of the binder may be polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 0.1 wt % to 15 wt % based on the total weight of the positive electrode active material layer.

The positive electrode may be prepared according to a typical method of preparing a positive electrode except that the above-described positive electrode active material is used. Specifically, a composition for forming a positive electrode active material layer, which is prepared by dissolving or dispersing the positive electrode active material as well as selectively the binder and the conductive agent, if necessary, in a solvent, is coated on the positive electrode collector, and the positive electrode may then be prepared by drying and rolling the coated positive electrode collector.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive agent, and the binder in consideration of a coating thickness of a slurry and manufacturing yield, and may allow to have a viscosity that may provide excellent thickness uniformity during the subsequent coating for the preparation of the positive electrode.

Also, as another method, the positive electrode may be prepared by casting the composition for forming a positive electrode active material layer on a separate support and then laminating a film separated from the support on the positive electrode collector.

Secondary Battery

Furthermore, in the present invention, an electrochemical device including the positive electrode may be prepared. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein, since the positive electrode is the same as described above, detailed descriptions thereof will be omitted, and the remaining configurations will be only described in detail below.

Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta(0<\beta<2)$, $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

The negative electrode active material may be included in an amount of 80 wt % to 99 wt % based on a total weight of the negative electrode active material layer.

The binder is a component that assists in the binding between the conductive agent, the active material, and the current collector, wherein the binder is typically added in an amount of 0.1 wt % to 10 wt % based on the total weight of the negative electrode active material layer. Examples of the binder may be polyvinylidene fluoride (PVDF), polyvinyl alcohol, carboxymethylcellulose (CMC), starch, hydroxypropyl cellulose, regenerated cellulose, polyvinylpyrrolidone, tetrafluoroethylene, polyethylene, polypropylene, an ethylene-propylene-diene polymer (EPDM), a sulfonated-EPDM, a styrene-butadiene rubber, a nitrile-butadiene rubber, a fluoro rubber, and various copolymers thereof.

The conductive agent is a component for further improving conductivity of the negative electrode active material, wherein the conductive agent may be added in an amount of 10 wt % or less, for example, 5 wt % or less based on the total weight of the negative electrode active material layer. The conductive agent is not particularly limited as long as it has conductivity without causing adverse chemical changes in the battery, and, for example, a conductive material such as: graphite such as natural graphite or artificial graphite; carbon black such as acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used.

For example, the negative electrode active material layer may be prepared by coating a composition for forming a negative electrode, which is prepared by dissolving or dispersing selectively the binder and the conductive agent as well as the negative electrode active material in a solvent, on the negative electrode collector and drying the coated negative electrode collector, or may be prepared by casting the composition for forming a negative electrode on a separate support and then laminating a film separated from the support on the negative electrode collector.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$. LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve life characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphorictriamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present invention stably exhibits excellent discharge capacity, output characteristics, and life characteristics, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

PREFERRED MODE FOR CARRYING OUT THE INVENTION

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

(Preparation of Positive Electrode Active Material)

A first transition metal-containing solution with a concentration of 2.3 M was prepared by mixing $NiSO_4$ and $MnSO_4$ in water in amounts such that a molar ratio of nickel:manganese was 95:5.

Also, a second transition metal-containing solution with a concentration of 2.3 M was prepared by mixing $NiSO_4$, $CoSO_4$, and $MnSO_4$ in water in amounts such that a molar ratio of nickel:cobalt:manganese was 59:12.5:28.5.

A container containing the first transition metal-containing solution and a container containing the second transition metal-containing solution were connected to a 250 L reactor set at 53° C. In addition, a 25% NaOH solution and a 15% $NH_4OH$ aqueous solution were prepared and connected to the reactor, respectively.

Subsequently, 55 L of deionized water was put in the reactor, and the reactor was then purged with nitrogen gas at a rate of 200 L/min to remove dissolved oxygen in the water and create a non-oxidizing atmosphere in the reactor. Thereafter, 50 mL of 25% NaOH was added to the reactor, and stirring was performed at a speed of 280 rpm and a temperature of 53° C. to maintain a pH at 11.9.

Thereafter, the first transition metal-containing solution and the second transition metal-containing solution were respectively added to the reactor at a rate of 63 mL/min while changing a ratio of the first transition metal-containing solution to the second transition metal-containing solution from 100 vol %:0 vol % to 0 vol %:100 vol %. Simultaneously, while addition rates of the NaOH aqueous solution and the $NH_4OH$ aqueous solution to the reactor were controlled to gradually reduce a pH in the reactor from 11.9 to 10.8, a co-precipitation reaction was performed for 24 hours to precipitate positive electrode active material precursor particles. The precipitated positive electrode active material precursor particles were separated and dried at 110° C. for 12 hours to prepare a positive electrode active material precursor represented by $Ni_{0.7}Co_{0.1}Mn_{0.2}(OH)_2$ in which nickel, cobalt, and manganese were gradually changed from a center of the particle to a surface thereof.

The positive electrode active material precursor thus obtained, $Li_2CO_3$, and doping elements Zr and Al were mixed in a molar ratio of 1:1.03:0.01:0.01, and sintering was performed at 830° C. for 10 hours in an oxygen atmosphere to prepare a positive electrode active material doped with 2,000 ppm of Zr and 1,000 ppm of Al and having a concentration gradient in which concentrations of the nickel, cobalt, and manganese were gradually changed from the center of the particle to the surface thereof.

(Preparation of Positive Electrode)

The above-prepared positive electrode active material, a Denka black conductive agent, and a polyvinylidene fluoride (PVDF) binder were mixed in a weight ratio of 95:2.5:2.5 in an N-methylpyrrolidone(NMP) solvent to prepare a positive electrode slurry. An aluminum foil was coated with the above-prepared positive electrode slurry, then roll-pressed, and dried at 120° C. for 12 hours to prepare a positive electrode.

(Preparation of Negative Electrode)

Natural graphite as a negative electrode active material, a carbon black conductive agent, and a styrene-butadiene rubber (SBR) binder were mixed at a weight ratio of 96:2:2 to prepare a negative electrode slurry. After a copper foil was coated with the negative electrode slurry and vacuum-dried at 110° C. for 2 hours to prepare a negative electrode, roll press was performed.

(Preparation of Secondary Battery)

After the above-prepared positive electrode and negative electrode and a 20 μm thick polyethylene separator (F20BHE, Tonen Chemical Corporation) were used to prepare a coin cell-type battery by a conventional method, an electrolyte solution, in which 1 M $LiPF_6$ was dissolved in a mixed solvent in which ethylene carbonate and dimethyl carbonate were mixed in a ratio of 1:1 (vol %), was injected to prepare a coin cell-type lithium secondary battery.

Example 2

During the preparation of a positive electrode active material, a first transition metal-containing solution with a concentration of 2.3 M was prepared by mixing $NiSO_4$ and $MnSO_4$ in water in amounts such that a molar ratio of nickel:manganese was 95:5, and a second transition metal-containing solution with a concentration of 2.3 M was prepared by mixing $NiSO_4$, $CoSO_4$, and $MnSO_4$ in water in amounts such that a molar ratio of nickel:cobalt:manganese was 55:20.5:24.5. A positive electrode active material and a positive electrode and a lithium secondary battery, which include the same, were prepared in the same manner as in Example 1 except that a positive electrode active material precursor having an average composition of $Ni_{0.65}Co_{0.15}Mn_{0.2}(OH)_2$ was prepared by using the first transition metal-containing solution and the second transition metal-containing solution and the positive electrode active material precursor was used.

Example 3

During the preparation of a positive electrode active material, a first transition metal-containing solution with a concentration of 2.3 M was prepared by mixing $NiSO_4$ and $MnSO_4$ in water in amounts such that a molar ratio of nickel:manganese was 95:5, and a second transition metal-containing solution with a concentration of 2.3 M was prepared by mixing $NiSO_4$, $CoSO_4$, and $MnSO_4$ in water in amounts such that a molar ratio of nickel:cobalt:manganese was 55:13.5:31.5. A positive electrode active material and a positive electrode and a lithium secondary battery, which include the same, were prepared in the same manner as in Example 1 except that a positive electrode active material precursor having an average composition of $Ni_{0.65}Co_{0.10}Mn_{0.25}(OH)_2$ was prepared by using the first transition metal-containing solution and the second transition metal-containing solution and the positive electrode active material precursor was used.

Example 4

During the preparation of a positive electrode active material, a first transition metal-containing solution with a concentration of 2.3 M was prepared by mixing $NiSO_4$ and $MnSO_4$ in water in amounts such that a molar ratio of nickel:manganese was 95:5, and a second transition metal-containing solution with a concentration of 2.3 M was prepared by mixing $NiSO_4$, $CoSO_4$, and $MnSO_4$ in water in amounts such that a molar ratio of nickel:cobalt:manganese was 55:17:28. A positive electrode active material and a positive electrode and a lithium secondary battery, which include the same, were prepared in the same manner as in Example 1 except that a positive electrode active material precursor having an average composition of $Ni_{0.65}Co_{0.125}Mn_{0.225}(OH)_2$ was prepared by using the first transition metal-containing solution and the second transition metal-containing solution and the positive electrode active material precursor was used.

Comparative Example 1

A transition metal-containing solution with a concentration of 2.3 M was prepared by mixing $NiSO_4$, $CoSO_4$, and $MnSO_4$ in water in amounts such that a molar ratio of nickel:cobalt:manganese was 70:10:20.

While the transition metal-containing solution was added to a 250 L reactor set at 53° C. at a rate of 63 mL/min, a NaOH aqueous solution and a $NH_4OH$ aqueous solution were respectively added at rates of 35 mL/min and 50 mL/min, and a co-precipitation reaction was performed at a pH of 11.2 for 24 hours to precipitate positive electrode active material precursor particles. A positive electrode active material and a positive electrode and a lithium secondary battery, which include the same, were prepared in the same manner as in Example 1 except that the above precipitated positive electrode active material precursor was used.

Comparative Example 2

A positive electrode active material and a positive electrode and a lithium secondary battery, which include the same, were prepared in the same manner as in Example 1 except that the pH in the reactor was maintained at 11.2 throughout the reaction.

Comparative Example 3

A positive electrode active material and a positive electrode and a lithium secondary battery, which include the same, were prepared in the same manner as in Comparative Example 1 except that a transition metal-containing solution with a concentration of 2.3 M was prepared by mixing $NiSO_4$, $CoSO_4$, and $MnSO_4$ in water in amounts such that a molar ratio of nickel:cobalt:manganese was 65:15:20, a positive electrode active material precursor of $Ni_{0.65}Co_{0.15}Mn_{0.20}(OH)_2$ was prepared by using the transition metal-containing solution, and the positive electrode active material precursor was used.

Comparative Example 4

A positive electrode active material and a positive electrode and a lithium secondary battery, which include the same, were prepared in the same manner as in Comparative Example 1 except that a transition metal-containing solution with a concentration of 2.3 M was prepared by mixing $NiSO_4$, $CoSO_4$, and $MnSO_4$ in water in amounts such that a molar ratio of nickel:cobalt:manganese was 65:12.5:22.5, a positive electrode active material precursor of $Ni_{0.65}Co_{0.125}Mn_{0.225}(OH)_2$ was prepared by using the transition metal-containing solution, and the positive electrode active material precursor was used.

Comparative Example 5

A positive electrode active material and a positive electrode and a lithium secondary battery, which include the same, were prepared in the same manner as in Comparative Example 1 except that a transition metal-containing solution with a concentration of 2.3 M was prepared by mixing $NiSO_4$, $CoSO_4$, and $MnSO_4$ in water in amounts such that a molar ratio of nickel:cobalt:manganese was 65:20:15, a positive electrode active material precursor of $Ni_{0.65}Co_{0.20}Mn_{0.15}(OH)_2$ was prepared by using the transition metal-containing solution, and the positive electrode active material precursor was used.

Comparative Example 6

A positive electrode active material and a positive electrode and a lithium secondary battery, which include the same, were prepared in the same manner as in Comparative Example 1 except that a transition metal-containing solution with a concentration of 2.3 M was prepared by mixing $NiSO_4$, $CoSO_4$, and $MnSO_4$ in water in amounts such that a molar ratio of nickel:cobalt:manganese was 65:17.5:17.5, a positive electrode active material precursor of $Ni_{0.65}Co_{0.175}Mn_{0.175}(OH)_2$ was prepared by using the transition metal-containing solution, and the positive electrode active material precursor was used.

Comparative Example 7

A first transition metal-containing solution with a concentration of 2.3 M was prepared by mixing $NiSO_4$ and $MnSO_4$ in water in amounts such that a molar ratio of nickel:manganese was 95:5.

Also, a second transition metal-containing solution with a concentration of 2.3 M was prepared by mixing $NiSO_4$, $CoSO_4$, and $MnSO_4$ in water in amounts such that a molar ratio of nickel:cobalt:manganese was 55:27.5:17.5.

A positive electrode active material and a positive electrode and a lithium secondary battery, which include the same, were prepared in the same manner as in Example 1 except that a positive electrode active material precursor having an average composition of $Ni_{0.65}Co_{0.20}Mn_{0.15}(OH)_2$ and having a concentration gradient in which Ni, Co, and Mn were gradually changed from a center of a particle to a surface thereof was prepared, and the positive electrode active material precursor was used.

Comparative Example 8

A first transition metal-containing solution with a concentration of 2.3 M was prepared by mixing $NiSO_4$ and $MnSO_4$ in water in amounts such that a molar ratio of nickel:manganese was 95:5.

Also, a second transition metal-containing solution with a concentration of 2.3 M was prepared by mixing $NiSO_4$, $CoSO_4$, and $MnSO_4$ in water in amounts such that a molar ratio of nickel:cobalt:manganese was 55:24:21.

A positive electrode active material and a positive electrode and a lithium secondary battery, which include the same, were prepared in the same manner as in Example 1 except that a positive electrode active material precursor having an average composition of $Ni_{0.65}Co_{0.175}Mn_{0.175}$ (OH)$_2$ and having a concentration gradient in which Ni, Co, and Mn were gradually changed from a center of a particle to a surface thereof was prepared, and the positive electrode active material precursor was used.

Figure 1:
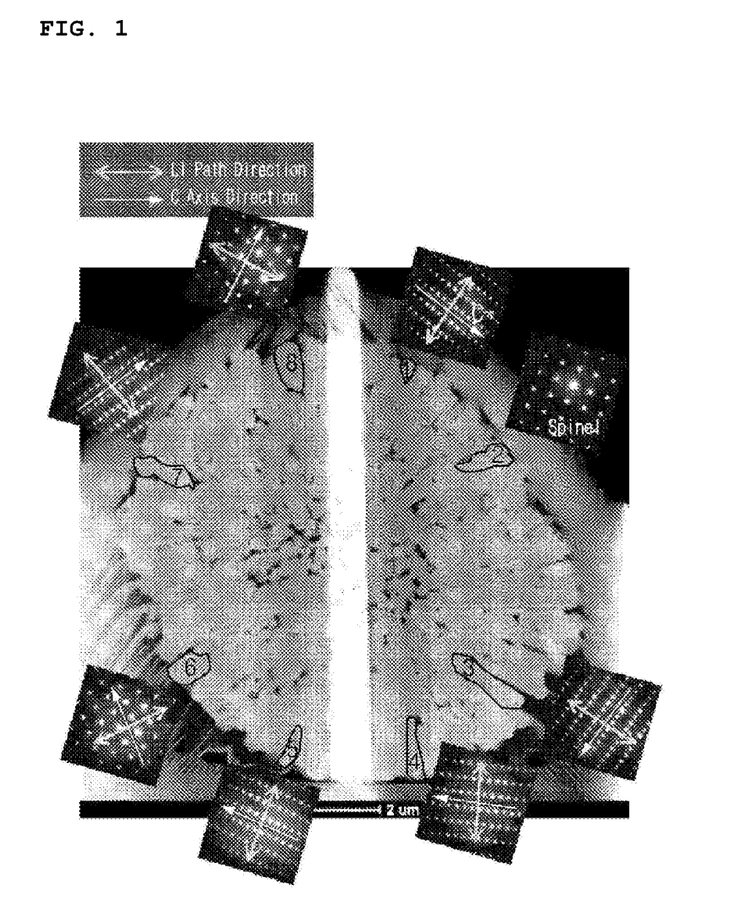
FIG. 1 is a surface transmission electron microscope (TEM) image of a positive electrode active material prepared in Example 1 and diffraction patterns of crystal structures of a surface of the positive electrode active material which are confirmed by selected area diffraction patterns (SADPs)
Figure 2:
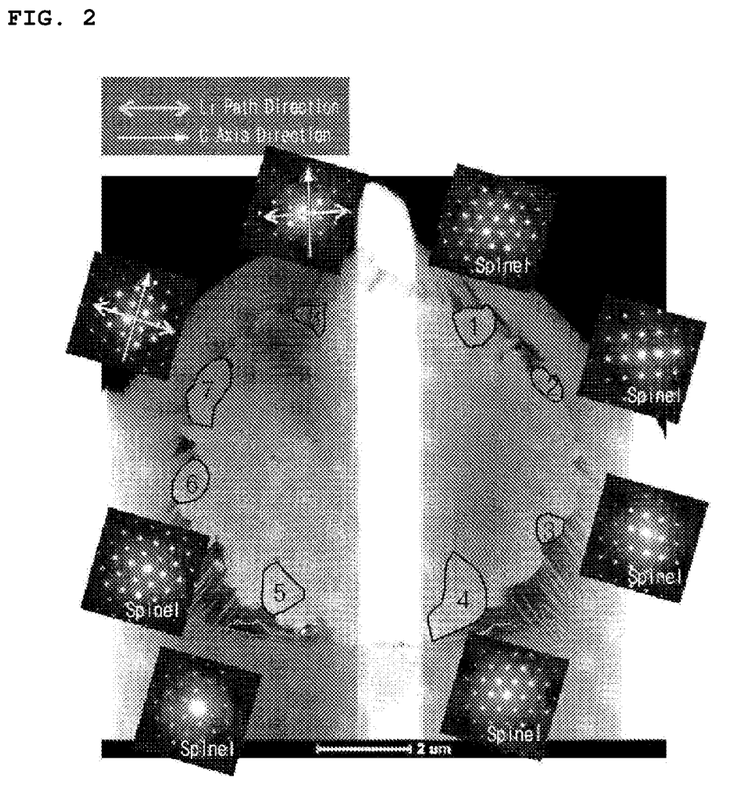
FIG. 2 is a surface TEM image of a positive electrode active material prepared in Comparative Example 1 and diffraction patterns of crystal structures of a surface of the positive electrode active material which are confirmed by SADPs.
Figure 3:
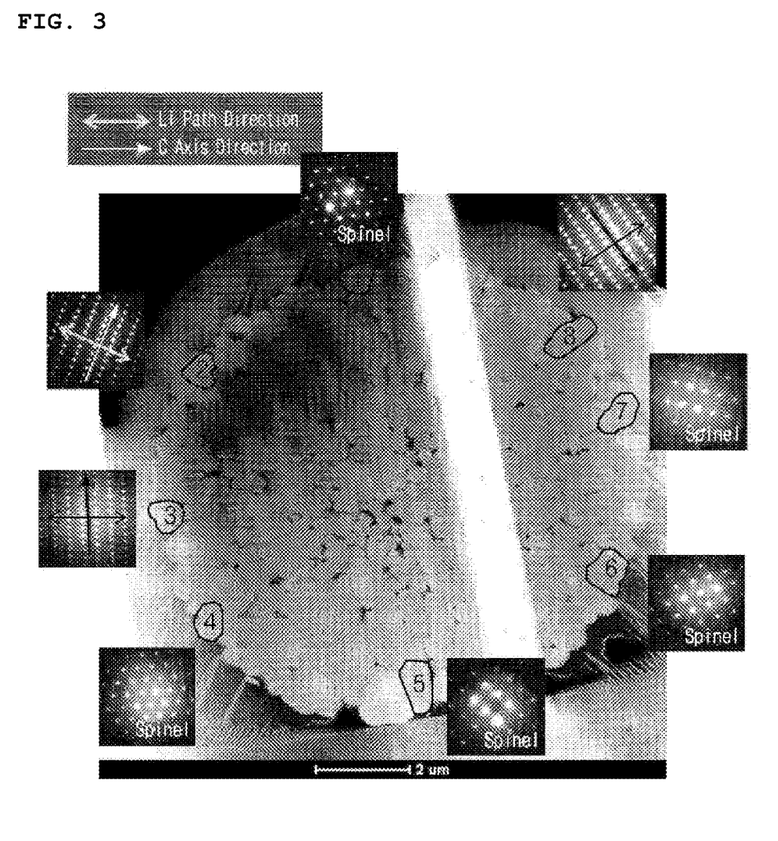
FIG. 3 is a surface TEM image of a positive electrode active material prepared in Comparative Example 2 and diffraction patterns of crystal structures of a surface of the positive electrode active material which are confirmed by SADPs.

Experimental Example 1: Confirmation of Surface Properties of Positive Electrode Active Material The positive electrode active material particles prepared in Example 1 and Comparative Examples 1 and 2 were cut, cross-sections of the positive electrode active materials were photographed using a transmission electron microscope (TEM), and crystal structures of surfaces of the positive electrode active materials were identified by selected area diffraction patterns (SADPs).

FIGS. 1, 2, and 3 are TEM images and SADPs of the positive electrode active materials prepared in Example 1 and Comparative Examples 1 and 2, respectively.

As illustrated in FIG. 1, with respect to the positive electrode active material prepared in Example 1, it may be confirmed that a surface portion included columnar-structured primary particles which were grown from a center of the positive electrode active material in a surface direction. Also, TEM analysis was performed on 8 points on the surface of the positive electrode active material to confirm lithium ion mobility on the surface of the positive electrode active material. Specifically, with respect to a lithium transition metal oxide having a layered structure, lithium ions move along a plane direction (yellow arrow in FIG. 1) satisfying 85° to 95° to a c-axis direction (red arrow in FIG. 1), wherein the yellow arrow in FIG. 1 is referred to as a lithium movement direction. Thus, in a case in which a ratio of the particles, in which an angle between the c-axis direction and the measured growth direction of the particle satisfies 85° to 95°, is high at 60% or more (that is, when the lithium movement direction of FIG. 1 coincides with the growth direction of the particle within ±5°), it may be confirmed that the lithium ion mobility on the surface of the positive electrode active material is excellent.

As illustrated in FIG. 1, as a result of the TEM analysis on the 8 points on the surface of the positive electrode active material (particles marked by solid lines 1 to 8 in the TEM image of FIG. 1 were measured), particles, in which the angle between the measured c-axis direction (red arrow in FIG. 1) and the growth direction of the particle at the measuring point satisfied 85° to 95°, were particles 1, 3, 4, 5, and 6 among the marked points in FIG. 1. Among the measured particles in FIG. 1, particle 2 had a spinel structure, and the particle growth directions of particles 7 and 8 did not form 85° to 95° with the c-axis direction. That is, with respect to the positive electrode active material prepared in Example 1, a ratio in which the angles between the c-axis directions measured at the 8 points on the surface and the particle growth direction at the measuring point satisfied 85° to 95° was 62.5%.

In contrast, as illustrated in FIG. 2, with respect to the positive electrode active material prepared in Comparative Example 1, although it was in the form of a secondary particle in which primary particles were agglomerated, it may be confirmed that shapes of the primary particles in a surface portion were irregular. Also, as a result of measuring c-axis directions through the TEM analysis of 8 points of the surface of the positive electrode active material, a spinel structure appeared at 6 points among the 8 points measured. It was found that the angle between the particle growth direction and the c-axis direction (red arrow in FIG. 2) satisfied 85° to 95° only at one of the two points showing a layered structure (particle 7 among the 8 points in the TEM image of FIG. 2 was only matched). That is, with respect to the positive electrode active material prepared in Comparative Example 1, a ratio in which the angles between the c-axis directions measured at the 8 points on the surface and the particle growth direction at the measuring point satisfied 85° to 95° was 12.5%. With respect to the spinel structure, since a lithium content was lower than that of the layered crystal structure, capacity and life characteristics were degraded.

Also, as illustrated in FIG. 3, with respect to the positive electrode active material prepared in Comparative Example 2, although it was in the form of a secondary particle in which primary particles were agglomerated, a formation rate of nucleus was increased during the reaction because the pH was not controlled during the preparation of the precursor, and thus, a ratio of the primary particles having a columnar structure, which were grown from a center of the positive electrode active material in a surface direction, in a surface portion of the positive electrode active material was low. Furthermore, as a result of TEM analysis on 8 points on the surface of the positive electrode active material, particles measured at 5 points among the measured points had a spinel structure, and an angle between a growth direction of the particle at the measuring point and a c-axis direction satisfied 85° to 95° for only the particle measured at one of the other three points (particle 6 among the 8 points in the TEM image of FIG. 3 was only matched). That is, with respect to the positive electrode active material prepared in Comparative Example 2, a ratio in which the angles between the c-axis directions measured at the 8 points on the surface and the particle growth direction at the measuring point satisfied 85° to 95° was 12.5%.

Experimental Example 2: Charge and Discharge Efficiency of Secondary Battery

Charge and discharge efficiency was evaluated for the secondary batteries prepared in Examples 1 to 4 and Comparative Examples 1 to 6, and the results thereof are presented in Table 1 below.

Specifically, each of the secondary batteries prepared in Examples 1 to 4 and Comparative Examples 1 to 6 was charged at a constant current of 0.1 C to 4.30 V, was left standing for 20 minutes, and then discharged at a constant current of 0.1 C to a voltage of 3.0 V to observe charge and discharge characteristics in the first cycle, and the results thereof are presented in the following Table 1 and FIG. 4.

TABLE 1

|  | Charge capacity (mAh/g) | Discharge capacity (mAh/g) | Efficiency (%) |
| --- | --- | --- | --- |
| Example 1 | 215.6 | 197.7 | 91.7 |
| Comparative Example 1 | 214.8 | 196.5 | 91.5 |
| Comparative Example 2 | 215.3 | 195.5 | 90.8 |
| Example 2 | 210.0 | 190.1 | 90.5 |
| Example 3 | 209.5 | 190.4 | 90.8 |
| Example 4 | 209.2 | 190.4 | 91.0 |
| Comparative Example 3 | 205.1 | 181.4 | 88.4 |
| Comparative Example 4 | 205.3 | 177.1 | 86.2 |

TABLE 1-continued

|  | Charge capacity (mAh/g) | Discharge capacity (mAh/g) | Efficiency (%) |
|---|---|---|---|
| Comparative Example 5 | 204.6 | 185.3 | 90.5 |
| Comparative Example 6 | 205.4 | 185.1 | 90.1 |

Figure 4:
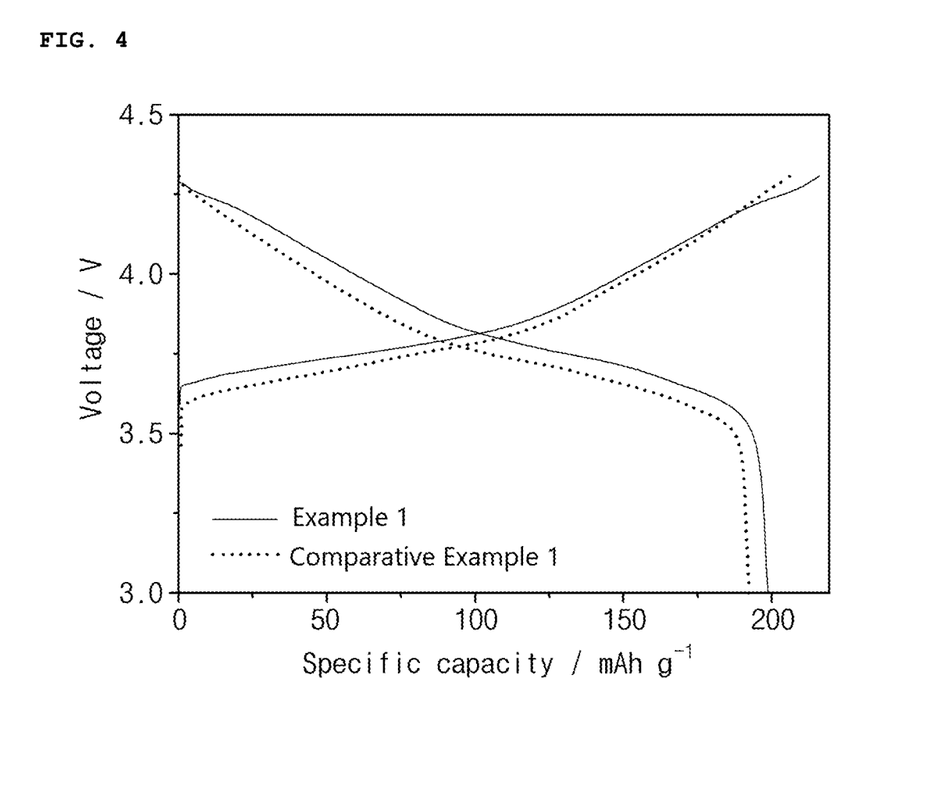
FIG. 4 is charge and discharge profile graphs of secondary batteries prepared in Example 1 and Comparative Example 1.

Referring to the results of Example 1 and Comparative Examples 1 and 2 in Table 1 and FIG. 4, with respect to the positive electrode active materials including the same amount of nickel, it may be confirmed that, with respect to Example 1 having a concentration gradient in which 60% or more of the c-axis directions formed a specific angle with the growth direction of the primary particles present on the surface thereof, efficiency was improved in comparison to that of Comparative Example 1 without a concentration gradient and a specific orientation and that of Comparative Example 2 having a concentration gradient but not having a specific orientation.

Also, referring to the results of Examples 2 to 4 and Comparative Examples 3 to 6 in Table 1, with respect to the secondary batteries prepared in Comparative Examples 3 and 4 without a concentration gradient in which the cobalt content in the lithium transition metal oxide was lower than the manganese content for the same nickel content, it may be confirmed that capacity decreased with a decrease in the cobalt content. In contrast, it may be confirmed that the secondary batteries, which were prepared by using the positive electrode active materials having a concentration gradient and a specific orientation even if the cobalt content in the lithium transition metal oxide was lower than the manganese content as in Examples 2 to 4, had an efficiency equal to or better than the secondary batteries of Comparative Examples 4 and 5 in which the cobalt content in the lithium transition metal oxide was greater than or equal to the manganese content.

Experimental Example 3: Confirmation of Output Characteristics of Secondary Battery Low-temperature (−10° C.) output characteristics of the lithium secondary batteries prepared in Examples 1 and 2 and Comparative Examples 1 to 6 were confirmed. Specifically, each of the lithium secondary batteries prepared in Examples 1 and 2 and Comparative Examples 1 to 6 was charged at a constant current of 0.33 C at room temperature (25° C.) and then discharged at a constant current of 0.4 C for 22.5 minutes to measure a voltage drop for 1,350 seconds, and the results thereof are presented in Table 2 below.

TABLE 2

|  | 0 to 10 seconds | | 0 to 1,350 seconds | |
|---|---|---|---|---|
|  | Voltage drop | Compared to Comparative Example 5 (%) | Voltage drop | Compared to Comparative Example 5 (%) |
| Example 1 | 0.212 | −0.003 | 0.580 | −0.012 |
| Comparative Example 1 | 0.217 | 0.002 | 0.591 | −0.001 |
| Comparative Example 2 | 0.220 | 0.005 | 0.588 | −0.004 |
| Example 2 | 0.210 | −0.005 | 0.582 | −0.01 |
| Comparative Example 3 | 0.22 | 0.005 | 0.609 | 0.017 |
| Comparative Example 4 | 0.251 | 0.036 | 0.611 | 0.019 |
| Comparative Example 5 | 0.215 | Ref. | 0.592 | Ref. |
| Comparative Example 6 | 0.226 | 0.011 | 0.603 | 0.011 |

Referring to Example 1 and Comparative Examples 1 and 2 of Table 2, with respect to Example 1 having a concentration gradient in which 60% or more of the c-axis directions formed a specific angle with the growth direction of the primary particles present on the surface thereof for the same composition, it may be confirmed that a voltage drop rate was lower than that of the secondary battery including the positive electrode active material of Comparative Example 1 without a concentration gradient and a specific orientation between the c-axis and the growth direction of the particle present on the surface thereof and that of the secondary battery including the positive electrode active material of Comparative Example 2 having a concentration gradient but not having a specific orientation between the c-axis and the growth direction of the primary particle present on the surface thereof.

In the positive electrode active materials including the same amount of nickel as in Example 2 and Comparative Examples 3 to 6, it may be confirmed that Comparative Examples 3 and 4 without a concentration gradient, in which the cobalt content in the lithium transition metal oxide was lower than the manganese content, had higher voltage drop rates due to the decrease in the cobalt content than Comparative Example 5 in which the cobalt content in the lithium transition metal oxide was greater than the manganese content.

In contrast, with respect to Example 2 having a concentration gradient in which the cobalt content in the lithium transition metal oxide was lower than the manganese content, but the growth direction of the particle present on the surface thereof formed a specific angle with the c-axis, it may be confirmed that, even if the cobalt content was reduced, a voltage drop rate was better due to the uniformity of the primary particles than that of Comparative Example 5 including the same amount of nickel and that of Comparative Example 3 having the same composition.

Experimental Example 4: Evaluation of High-Temperature Life Characteristics and Resistance Characteristics of Secondary Battery Life characteristics and resistance characteristics of the secondary batteries including the positive electrodes prepared in Examples 1 to 4 and Comparative Examples 1 to 8 were measured. Specifically, each of the secondary batteries prepared in Examples 1 to 4 and Comparative Examples 1 to 8 was charged at a constant current of 1 C to 4.25 V at 45° C. and cut-off charged at 3 C. Thereafter, discharge was performed at a constant current of 1 C to a voltage of 3.0 V. The charging and discharging behaviors were set as one cycle, and, after this cycle was repeated 300 times, capacity retentions and resistance increase rates with cycles of the secondary batteries according to Examples 1 to 4 and Comparative Examples 1 to 8 were measured. With respect to the life characteristics, capacity in a 300th cycle was divided by initial capacity and then multiplied by 100 to calculate a value, and, with respect to the resistance characteristics, after resistance in the 300th cycle was divided by initial resistance and multiplied by 100 to calculate a value, the results thereof are presented in the following Table 3 and FIG. 5.

TABLE 3

|  | Life characteristics in the 300th cycle at 45° C. (%) | DCIR in the 300th cycle at 45° C. (%) |
| --- | --- | --- |
| Example 1 | 91.7 | 137.7 |
| Comparative Example 1 | 83.6 | 160.2 |
| Comparative Example 2 | 88.5 | 150.4 |
| Example 2 | 91.3 | 133.5 |
| Example 3 | 91.8 | 138.7 |
| Example 4 | 91.5 | 137.7 |
| Comparative Example 3 | 90.1 | 150.9 |
| Comparative Example 4 | 89.9 | 152.1 |
| Comparative Example 5 | 89.6 | 145.5 |
| Comparative Example 6 | 90.5 | 147.8 |
| Comparative Example 7 | 92.5 | 140.2 |
| Comparative Example 8 | 91.2 | 142.5 |

Figure 5:
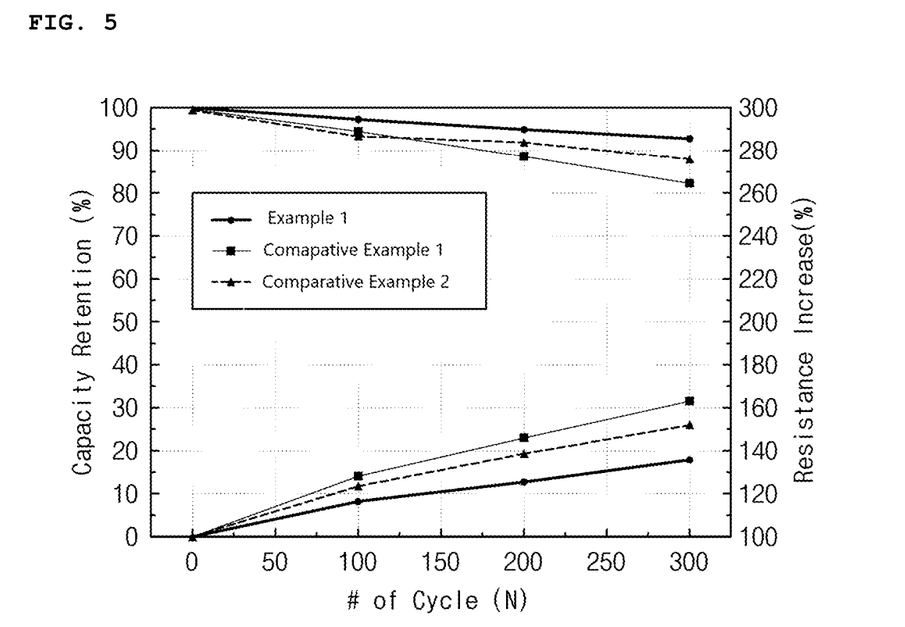
FIG. 5 is a graph illustrating capacity retentions and resistance increase rates during 300 cycles of secondary batteries prepared in Example 1 and Comparative Examples 1 and 2.

In the positive electrode active materials including the same amount of nickel as illustrated in the results of Example 1 and Comparative Examples 1 and 2 of Table 3 and FIG. 5, it may be confirmed that life characteristics and resistance characteristics of the secondary battery prepared in Example 1 were improved in comparison to those of Comparative Example 1, in which the same nickel content was included, but the lithium transition metal oxide did not have a concentration gradient, and those of Comparative Example 6 which did not have a specific orientation because the pH was not controlled during the preparation of the lithium transition metal oxide.

Also, with respect to the secondary batteries prepared in Examples 2 to 4 and Comparative Examples 3 to 8 which included the same nickel content, it may be confirmed that life characteristics and resistance characteristics were improved in comparison to those of Comparative Examples 3, 4, and 6 without a concentration gradient in which the cobalt content in the lithium transition metal oxide was less than or equal to the manganese content. Furthermore, it may be confirmed that life characteristics and resistance characteristics were improved in comparison to those of Comparative Example 5 in which the cobalt content in the lithium transition metal oxide was greater than the manganese content, but there was no concentration gradient.

With respect to the secondary batteries prepared in Examples 2 to 4, the life characteristics were inferior to those of the secondary batteries of Comparative Examples 7 and 8 having a concentration gradient in which the cobalt content in the lithium transition metal oxide was greater than or equal to the manganese content, particularly Comparative Example 7 in which the cobalt content was the highest, but it may be confirmed that the resistance characteristics were improved in comparison to those of Comparative Examples 7 and 8 because lithium ion mobility was increased by having the specific orientation.

The invention claimed is:

1. A positive electrode active material comprising:
a lithium transition metal oxide having an average composition represented by Formula 1 in which a cobalt content in the lithium transition metal oxide is less than a manganese content,
wherein at least one of nickel, cobalt, or manganese in the lithium transition metal oxide has a concentration gradient that gradually changes from a center of a particle to a surface thereof,
the positive electrode active material is in a form of a secondary particle formed by agglomeration of primary particles, and
a ratio in which angles between c-axis directions, which are measured at at least 8 points on a surface of the positive electrode active material by transmission electron microscope (TEM) analysis, and a growth direction of the particle at the measuring point satisfy 85° to 95° is 60% or more:

$$Li_{1+a}Ni_xCo_yMn_zM^1_wO_2$$ [Formula 1]

wherein, in Formula 1,
$0 \leq a \leq 0.3$, $0.65 \leq x < 1$, $0 < y \leq 0.35$, $0 < z \leq 0.35$, $0 \leq w \leq 0.02$, and $y < z$, and
$M^1$ comprises at least one selected from the group consisting of aluminum (Al), zirconium (Zr), magnesium (Mg), zinc (Zn), yttrium (Y), iron (Fe), and titanium (Ti).

2. The positive electrode active material of claim 1, wherein a molar ratio of cobalt:manganese in the lithium transition metal oxide is in a range of greater than 1:1 to 1:10 or less.

3. The positive electrode active material of claim 1, wherein the positive electrode active material comprises columnar-structured primary particles, which are grown in a surface direction from a center of the positive electrode active material, in a surface portion.

4. The positive electrode active material of claim 1, wherein the lithium transition metal oxide represented by Formula 1 comprises the cobalt in an amount of greater than 0 mol % to 15 mol % or less based on the total number of moles of transition metals excluding lithium.

5. The positive electrode active material of claim 1, wherein the lithium transition metal oxide represented by Formula 1 comprises the manganese in an amount of 20 mol % or more to less than 35 mol % based on the total number of moles of transition metals excluding lithium.

6. A positive electrode for a lithium secondary battery, the positive electrode comprising the positive electrode active material of claim 1.

7. A lithium secondary battery comprising the positive electrode of claim 6.

8. The positive electrode active material of claim 3, wherein the columnar-structure primary particles have a column-structure having an aspect ratio of 2 to 5.

* * * * *